(12) United States Patent
Luncan et al.

(10) Patent No.: US 12,495,178 B2
(45) Date of Patent: Dec. 9, 2025

(54) APPARATUS AND METHODS FOR USE WITH A MEDIA PLAYER

(71) Applicant: JAGUAR LAND ROVER LIMITED, Coventry (GB)

(72) Inventors: Daniel Luncan, Coventry (GB); Conrad Riggs, Coventry (GB); Sijo Antony, Coventry (GB); Lovene Bhatia, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 74 days.

(21) Appl. No.: 18/701,552

(22) PCT Filed: Oct. 19, 2022

(86) PCT No.: PCT/EP2022/079105
§ 371 (c)(1),
(2) Date: Apr. 15, 2024

(87) PCT Pub. No.: WO2023/067003
PCT Pub. Date: Apr. 27, 2023

(65) Prior Publication Data
US 2024/0397136 A1    Nov. 28, 2024

(30) Foreign Application Priority Data
Oct. 21, 2021   (GB) ...................................... 2115075

(51) Int. Cl.
*H04N 21/414* (2011.01)
*H04L 9/32* (2006.01)

(52) U.S. Cl.
CPC ..... *H04N 21/41422* (2013.01); *H04L 9/3213* (2013.01); *H04L 2209/60* (2013.01)

(58) Field of Classification Search
CPC .......... H04N 21/41422; H04L 2209/60; H04L 9/3213
See application file for complete search history.

(56) References Cited

U.S. PATENT DOCUMENTS

2013/0347025 A1* 12/2013 Prakash ........... H04N 21/25875
725/25
2016/0094678 A1*  3/2016 Kumar .................... G06F 21/62
709/219

(Continued)

FOREIGN PATENT DOCUMENTS

EP          3565265 A1   11/2019

OTHER PUBLICATIONS

Great Britain Intellectual Property Office, Search Report under Section 17 Issued in Application No. GB2115075.0, Apr. 13, 2022, 4 pages.

(Continued)

*Primary Examiner* — Mulugeta Mengesha
(74) *Attorney, Agent, or Firm* — McCoy Russell LLP

(57) ABSTRACT

A control system for a media player includes a media player application associated with a first set of account credentials for accessing a remote streaming media source to receive streaming media content to output the streaming media on the media player, a digital personal assistant application associated with a second set of account credentials for accessing the remote streaming media source to receive streaming media content to output the streaming media on the media player, a streaming media source interface component for receiving account credentials to access the remote streaming media source and a command for requesting media from the remote streaming media source and a streaming media source manager arranged to dynamically select one of the media player application and the digital personal assistant application to provide one of the respec- (Continued)

tive first and second sets of account credentials to the streaming media source interface component to access the remote streaming media source.

16 Claims, 4 Drawing Sheets

(56) References Cited

U.S. PATENT DOCUMENTS

2019/0318069 A1* 10/2019 Mitic .................... H04W 12/04
2019/0327509 A1* 10/2019 Lenhart .............. H04N 21/4627
2019/0332347 A1* 10/2019 Cedborg ................ G06F 3/165

OTHER PUBLICATIONS

ISA European Patent Office, International Search Report and Written Opinion Issued in Application No. PCT/EP2022/079105, Mar. 15, 2023, WIPO, 9 pages.

* cited by examiner

APPARATUS AND METHODS FOR USE WITH A MEDIA PLAYER

CROSS REFERENCE TO RELATED APPLICATIONS

The present application is a U.S. National Phase of International Application No. PCT/EP2022/079105 entitled "APPARATUS AND METHODS FOR USE WITH A MEDIA PLAYER," and filed on Oct. 19, 2022. International Application No. PCT/EP2022/079105 claims priority to Great Britain Patent Application No. 2115075.0 filed on Oct. 21, 2021. The entire contents of each of the above-listed applications are hereby incorporated by reference for all purposes.

TECHNICAL FIELD

The present disclosure relates to apparatus and methods for use with a media player. Aspects of the invention relate to a control system for a media player, to a system, to a vehicle, to a method for use with a media player and to computer software.

BACKGROUND

It is known to provide a media player for reproducing media, such as audio, to a user. The media may be obtained i.e. streamed from an online source, such as over the internet. Increasingly vehicles have media players which connect to a remote or online streaming media source. A user is able to select desired media and the media player reproduces the streamed media using one or more output devices within the vehicle. Where the media is audio e.g. music the user selects the desired media, such as by selecting an artist, album or track for example, and the media player requests the selected media from the online source such as a computer server. In response the media player is provided with the requested media, e.g. an audio track, in the form of a media stream for reproduction by the media player.

In order to control the accessibility of the media stream, the media player is associated with account credentials for accessing the streaming media source, i.e. the remote computer server, to receive the streaming media. The account credentials can be checked by the streaming media source to ensure current validity at least before the media stream is provided. However, problems exist where a user has more than one account, and thus one or more sets of account credentials, for accessing the streaming media source. If multiple account credentials exist then the remote streaming media source may recognise a media player device as two different devices each associated with respective account credentials.

It is an aim of the present invention to address one or more of the disadvantages associated with the prior art.

SUMMARY OF THE INVENTION

Aspects and embodiments of the invention provide an control system, a system, a vehicle a method and to computer software as claimed in the appended claims According to an aspect of the present invention there is provided a control system for a media player, the control system comprising one or more controllers, the control system comprising a streaming media source interface component for receiving account credentials to access the remote streaming media source and a streaming media source manager arranged to dynamically select a source of account credentials provided to the streaming media source interface component to access the remote streaming media source. Advantageously the streaming media source manager allows multiple sources of account credentials to utilise the streaming media source interface component. Advantageously the control system is recognised as only a single hardware system when accessing the streaming media source.

According to an aspect of the present invention there is provided a control system for a media player, the control system comprising one or more controllers, the control system comprising a media player application associated with a first set of account credentials for accessing a remote streaming media source to receive streaming media content to output the streaming media on the media player, a digital personal assistant application associated with a second set of account credentials for accessing the remote streaming media source to receive streaming media content to output the streaming media on the media player, a streaming media source interface component for receiving account credentials to access the remote streaming media source and a command for requesting media from the remote streaming media source, and a streaming media source manager arranged to dynamically select one of the media player application and the digital personal assistant application to provide one of the respective first and second sets of account credentials to the streaming media source interface component to access the remote streaming media source. Advantageously the streaming media source manager allows multiple sources of account credentials to utilise the streaming media source interface component. Advantageously the control system is recognised as only a single hardware system when accessing the streaming media source.

The command may be a request to reproduce streaming media provided by the streaming media source. Advantageously the streaming media source is instructed to provide streaming media utilising the selected account credentials.

Preferably the streaming media source manager is arranged to perform said selection in dependence on a comparison of the first and second sets of account credentials. Advantageously the selection of account credentials may only be made in dependence on the comparison, such as when the account credentials differ.

The streaming media source manager may be arranged to perform said selection in dependence on a currently active one of the media player application and the digital personal assistant application. Advantageously the currently active application may be selected.

The streaming media source manager may be arranged to perform said selection in dependence on one or more characteristics of a user input corresponding to the command for controlling the remote streaming media source. Advantageously the one or more characteristics of the user input may be used to determine the selection.

The streaming media source manager is optionally arranged to perform said selection in dependence on the first set of account credentials differing from the second set of account credentials. Advantageously only when the account credentials differ may it be necessary to make a selection.

The one or more characteristics may comprise the user input being indicative of a command to request the streaming media content from the remote streaming media source. Advantageously when the input is indicative of the request the selection may be made.

The user input may be indicative of a play command comprising an identification of the streaming media content requested from the remote streaming media source. Advantageously when the input corresponds to the play command the selection may be made.

The user input is optionally indicative of a playback command to request streaming media content relative to current streaming media content from the remote streaming media source. Advantageously when the input corresponds to the playback command the selection may be made.

The streaming media source manager may be arranged to select the media player application in dependence on the one or more characteristics of the user input comprising a source of the user input being the digital personal assistant, and the media player application being currently active. Advantageously when the source of the input differs from the currently active application the selection may be made.

The streaming media source manager is optionally arranged to select the media player application in dependence on the digital media player application being currently active. Advantageously the media player application is selected when active.

Optionally the one or more characteristics of the user input comprise a type of the user input. Advantageously the type of the inputs may influence the selection. The type of user input may be selected from one of a plurality of predetermined types. Advantageously the different types of input may have corresponding selections. The type may comprise touch and voice input.

When the type of the user input corresponds to a voice input, the streaming media source manager may be arranged to select the digital personal assistant application. Advantageously the digital personal assistant application may be the most appropriate selection.

When the type of the user input corresponds to a voice input, the streaming media source manager may be arranged to select the currently active one of the media player application and the digital personal assistant application. Advantageously the selection may be made to utilise the currently active application.

The providing one of the respective first and second sets of account credentials to the streaming media source interface component to access the remote streaming media source optionally comprises the streaming media source manager logging one of the media player application and the digital personal assistant application into the streaming media source interface component using the respective one of the first and second sets of account credentials. Advantageously the one of the media player application and the digital personal assistant application is associated with the streaming media source interface component.

Each of the first and second sets of account credentials may comprise a respective one of a first and second authorisation token and the selecting comprises providing the authorisation token to the streaming media source interface component. The token may advantageously be used to access the streaming media source.

The streaming media source manager is optionally arranged, when the selected one of the media player application and the digital personal assistant application is not the currently active one of the media player application and the digital personal assistant application, to log the currently active one of the media player application and the digital personal assistant application out of the streaming media source interface component. Advantageously the currently active one of the media player application and the digital personal assistant application is dissociated with the streaming media source.

According to another aspect of the invention, there is provided a system, comprising a control system according to an aspect of the invention, and a media player comprising at least one output device for outputting the streaming media content to the user.

The at least one output device optionally comprises one or both of an audio output device and a display device.

The system may comprise an input device for receiving a user input.

The input device may comprise one or both of a microphone, a gesture recognition apparatus and a touch sensitive interface.

The touch sensitive interface is optionally a touch sensitive display device.

According to a further aspect of the invention, there is provided a vehicle comprising a control system according to an aspect of the invention or a system according to an aspect of the invention.

According to a still further aspect of the invention, there is provided a method for use with a system comprising a media player application associated with a first set of account credentials for accessing a remote streaming media source to receive streaming media content to output the streaming media on the media player and a digital personal assistant application associated with a second set of account credentials for accessing the remote streaming media source to receive streaming media content to output the streaming media on the media player, the method comprising selecting, by a streaming media source manager, one of the media player application and the digital personal assistant application to dynamically provide one of respective first and second sets of account credentials to a streaming media source interface component to access a remote streaming media source, and receiving, at the streaming media source interface component, the selected account credentials to access the remote streaming media source and a command for requesting media from the remote streaming media source.

Said selection may be made in dependence on a comparison of the first and second sets of account credentials, a currently active one of the media player application and the digital personal assistant application, and one or more characteristics of a user input corresponding to the command for controlling the remote streaming media source.

The selection is optionally made in dependence on the first set of account credentials differing from the second set of account credentials.

According to yet another aspect of the invention, there is provided a computer readable instructions which, when executed by a computer, are arranged to perform a method according to an aspect described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
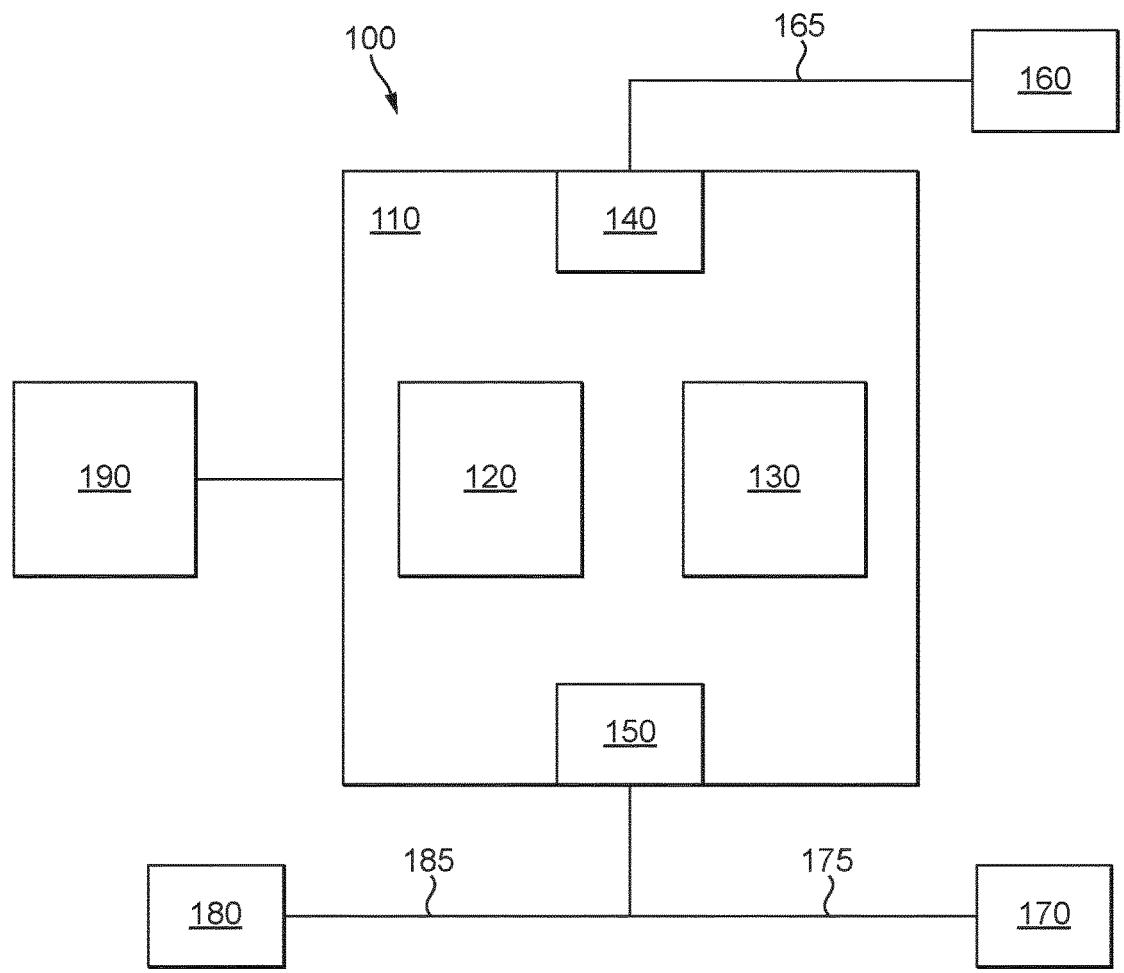
FIG. 1 shows a system according to an embodiment of the present invention.
Figure 2:
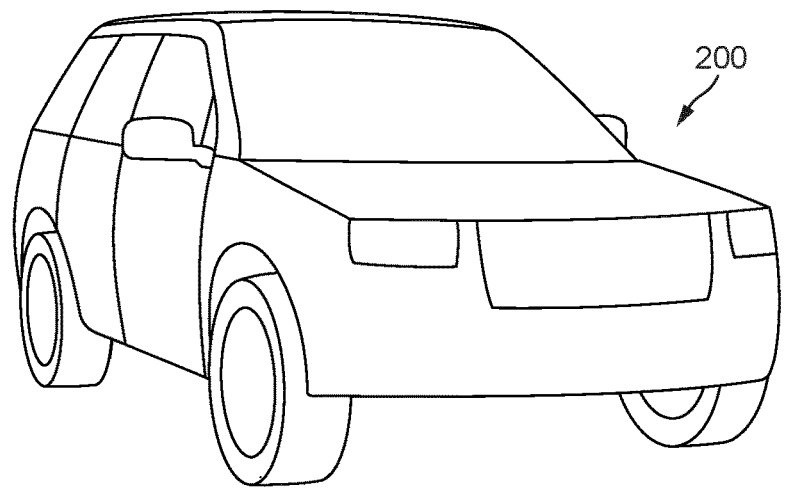
FIG. 2 shows a vehicle according to an embodiment of the invention.

A system 100 in accordance with an embodiment of the present invention is described herein with reference to the accompanying FIG. 1. The system 100 may in use be installed in a vehicle 200, such as illustrated in FIG. 2. The vehicle 200 in the illustrated embodiment is an automobile, such as a wheeled vehicle, but it will be understood that the system 100 may be used in other types of vehicle, such as aircraft and watercraft.

With reference to FIG. 1, the system 100 comprises a control system 110, which may be used with the vehicle 200. The control system 100 comprises one or more controller 110. The control system 110 illustrated in FIG. 1 comprises one controller 110 although it will be appreciated that the control system 110 may be formed by two or more controller 110 which act in combination. The system 100 is a control system for a media player 100 for outputting media, such as audio content, to a user. As illustrated, the system 100 may form the media player by comprising one or more output devices, although it will be realised that the system may output content to a separate media player system for reproduction. In a vehicle the media player may be an infotainment (information & entertainment) system which in use outputs audio-visual content to occupants of the vehicle, such as for information e.g. traffic information and for entertainment e.g. audible content such as music, audio books etc.

The control system 100 as illustrated in FIG. 1 comprises one controller 110, although it will be appreciated that this is merely illustrative. The controller 110 comprises processing means 120 and memory means 1130. The processing means 120 may be one or more electronic processing device 120 or processor 120 which operably executes computer-readable instructions. The memory means 130 may be one or more memory device 130 or memory 130. The memory 130 is electrically coupled to the processor 120. The memory 130 is configured to store instructions, and the processor 120 is configured to access the memory 130 and execute the instructions stored thereon.

The controller 110 comprises an output means 140 and an input means 150. The output means 140 may comprise an electrical output 140 of the controller 110. The input means 150 may comprise an electrical input 150 of the controller 110. The input 150 is arranged to receive user input data 175, 185 indicative of a user input from one or more user input devices 170, 180. The user input data 175, 185 is an electrical signal which is indicative of the user input applied to the one or user input devices 170, 180 which may be located within the vehicle 200. The user input may be in the form of a touch input, such as provided via one or more buttons, keys or another input device 170, a touch input applied to a touch-sensitive display device 180, a spoken audible command indicative of the user input which is received at a microphone 170 which is arranged to output audio data 175 to the controller 110, a gesture recognised using a vision system which may include a camera, or a combination thereof. The user input data 175, 185 indicative of the user input is provided to the control system 110. For example, the user input may be indicative of a selection of media which is provided to the control system 110. In one example, the user input may be a play command indicative of a selection of a media stream which may correspond to an album or artist although it will be realised that other selection criteria may be used. The user input may be indicative of an identifying request for the media, such as a request for an identified album and/or artist, for example applied to a graphically displayed keyboard, a selection of a graphically displayed icon corresponding to the album or a spoken request "Play Supergrass I Should Coco". In such cases, a request to a streaming media source for the media may be accompanied by identification (ID) information for the requested media. In another example, the user request may be a playback command where the requested media is relative to other media, such as previously reproduced media. For example, the request may be a playback command to resume playing, pause, skip to a previous or next track etc. Such a playback command may be provided via physical buttons, such as may be located on a steering wheel or console of a vehicle, or via a GUI of the display device e.g. the user touching a displayed icon, or as a spoken request.

The output 140 is arranged to output audio and/or video data 165 which is indicative of one or both of video and/or audio output from the control system 110 to one or more output devices 160, which may be associated with the vehicle 200. In this sense, the one or more output devices 160 may be understood to be the media player 160 i.e. suitable for outputting or reproducing the media content. The media player 160 may comprise an amplifier and/or processing circuitry or systems for processing audio data prior to output by the one or more speakers. As an example, further reference is made to the control system 110 outputting audio data 165 to one or more speakers 160. The one or more speakers may be arranged within an interior of the vehicle 200.

The control system 100 may be associated with a communication means 190. The controller 110 may be communicatively coupled with the communication means 190 in the form of a wireless communication module 190 for wirelessly transmitting and receiving data. The communication module 190 may communicate data via a telecommunication communication protocol such as 4G (LTE) or 5G standards, for example. The controller 110 may use the communication module 190 to communicate with a remote streaming media source, such as a remote computer server i.e. a 'cloud computer' to request streaming media and to receive streaming media content from the remote streaming media source.

It will be appreciated that, in some embodiments, the input 140 and output 150 may be combined e.g. as a network interface to a communication bus of the vehicle 200. The controller 110 is arranged to communicate with the one or more output devices 160 and the one or more user input devices 170, 180 via the communication bus. The controller 110 may communicate with the communication module 190 to send and receive data via the communication bus.

Figure 3:
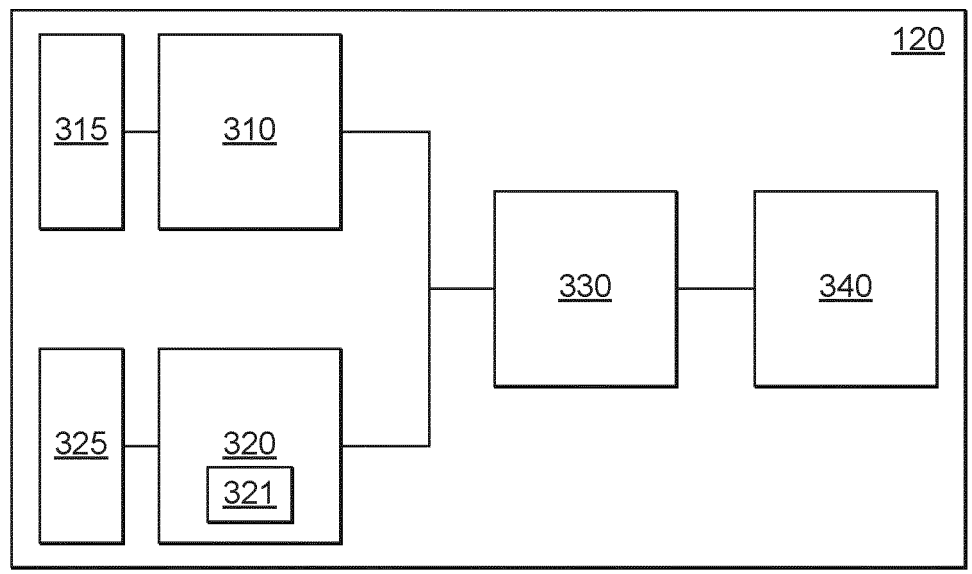
FIG. 3 shows an arrangement of functional units according an embodiment of the present invention.

FIG. 3 illustrates functional units or modules which are operably executed on the processor 120. The processor 120 operably executes a media player application (MPA) 310, a digital personal assistant application (DPA) 320, a streaming media source interface component 340 and a streaming media source manager 330.

The media player application, MPA, 310 is a dedicated application which is executed on the processor 120 for accessing the remote streaming media source to receive streaming media content to outputting the streaming media via the one or more output devices 160 e.g. speakers. The media player application 310 executes on an operating system supported by the processor 120 to independently obtain and reproduce the streaming media, such as audio, within the vehicle 200.

The digital personal assistant application, DPA, 320 is an agent or application for performing a variety of tasks. In particular, the DPA 320 is arranged to receive the audio data 175 from the microphone 170 indicative of a spoken command. Often, although not necessarily, the audio data is indicative of a Wake-up-Word (WuW) such as a name of the DPA application e.g. 'Bob' followed by a command, such as 'play music', 'next track' or 'play Shed 7'. The DPA 320 may communicate with a remote server supporting the DPA application 320 e.g. to verify the WuW and interpret the spoken command. The DPA application 320 may interface with other components or modules to perform requested functions. For example, the DPA application 320 may comprise a media player module 321 for accessing the remote streaming media source to receive streaming media content to output the streaming media via the one or more output devices 160 e.g. speakers. The media player module 321 may be an extension embedded in the DPA 320. When the media player module 321 of the DPA 320 is in use, a corresponding GUI may be displayed on the display device 180. The media player module 321 interfaced with the DPA 320 may correspond to the media player application 310 in that both are provided for independently accessing the same streaming media source.

Therefore it will be appreciated that the control system 100 provides at least two sets of functionality for accessing the remote streaming media source to output streaming media, namely via the MPA 310 and the DPA 320. That is, each of the MPA 310 and the DPA 320 are able to obtain streaming media content and reproduce the streamed media content on the one or more output devices 160, such as speakers, within the vehicle 200.

Each of the MPA 310 and the DPA 320 are associated with respective account credentials 315, 325 for accessing the streaming media source, i.e. computer server, to receive the streaming media. The account credentials received at the streaming media source can be checked e.g. to ensure current validity at least before the media stream is provided to the corresponding one of the MPA 310 and the DPA 320. Each of the account credentials may comprise, for example, a user ID and a password in one embodiment. Data corresponding to the account credentials may be stored in the memory 130. Each of the account credentials may have been received at the controller based on a user input at one of the input devices e.g. entered via a GUI of the display device 180 (such as using a displayed keyboard) or received at the controller 110 from another device such as a portable computing device e.g. mobile phone. In another embodiment, the account credentials may comprise a token for accessing the streaming media source. In some embodiments, the token is an access token for accessing the streaming media source. The access token may have been obtained by a prior process, such as linking one or each of the MPA 310 and the DPA 320 with the streaming media source. The process of linking each of the MPA 310 and the DPA 320 with the streaming media source may obtain a respective access token and associated username from the streaming media source for each of the media player application 310 and the DPA 320. Thus, if one of the media player application 310 and the DPA 320 is not linked with the streaming media source, no access token and/or username may be associated therewith. In one embodiment, the access token is associated with identification information such as a corresponding username. As will be appreciated, the access token may have an associated period of validity after which it is necessary to obtain a new access token.

In FIG. 1, the MPA 310 is associated with a first set of account credentials 315 ('first credentials' 315) and the DPA 320 with a second set of account credentials 325 ('second credentials' 325). When the first and second sets of account credentials correspond to different accounts, or where for example one of the sets of credentials is null i.e. has not been entered or received at the controller 110, technical problems have been identified. For example, the DPA 320 is unable to interface with the media player application 310 such that audible instructions received and interpreted by the DPA 320 are used to the control the media player application 310.

In order to access the streaming media source, an interface component 340 is required to be hosted. The interface component provides, for example, an API for allowing a module or application executing at the controller 110 to obtain the streaming media from the remote streaming media source. The API may receive data corresponding to the account credentials from a module or application and verify the account credentials with the remote streaming media source e.g. the module or application 'logs into' the interface component 340 by providing the account credentials via the API, such that the interface component authorises or checks the validity of the account credentials with the streaming media source. For example, the MPA 310 or the DPA 320 may provide the access token and the associated username to the interface component. The access token and the associated username may be provided to the interface component 340 via an API to 'log in'. In response, the interface component 340 validates the credentials provided by the media player application 310 or the DPA 320 by sending a request to the streaming media source or an authorisation server associated therewith, which confirms validity. Thus only one set of account credentials may be used with the interface component at any one time. The interface component 340 allows the module or application to control media playback e.g. provides play, pause, skip to next etc functionality. The interface component may also one or both of decode and/or decrypt received media e.g. audio samples received from the streaming media source. The streaming media source recognises each instance of the interface component as a separate device e.g. the streaming media source may allocate a respective device ID or name to each instance of the interface component. In order to support different sets of account credentials i.e. where the first and second sets of account credentials 315, 325 correspond to different accounts, or where only one set of valid credentials exists, each of the MPA 310 and the DPA 320 may be associated with a respective interface component. However, in this case, the remote streaming media source identifies the two interface components as different devices. As such, increased resources are required at the controller e.g. memory usage and the system 100 is more prone to errors or failures occurring when accessing the streaming media source.

In embodiments of the invention, the streaming media source manager 330 is arranged to dynamically interface the media player application 310 and the DPA 320 with the streaming media source interface component 340 corresponding to the interface component for the streaming media source, as will be explained. Advantageously allowing both the media player application 310 and the DPA 320 to utilise the same streaming media source interface component 340 reduces resource usage of the system 100, improves reliability and avoids the remote streaming media source logically interfacing with two separate devices.

In embodiments of the invention, the streaming media source manager 330 is arranged to dynamically select one of the media player application 310 and the digital personal assistant application 320 to provide one of the respective first and second sets of account credentials 315, 325 to the streaming media source interface component 340 to access the remote streaming media source. That is, the streaming media source manager 330 dynamically selects one of the one of the media player application 310 and the digital personal assistant application 320 to associate using their respective account credentials 315, 325 with the interface component 340 for accessing streaming media from the streaming media source. The selection is made in dependence on one or more predetermined criteria, as will be explained. The predetermined criteria may include at least a comparison of the first set of account credentials 310 with the second set of account credentials 320. When the streaming media source manager 330 selects one of the media player application 310 and the digital personal assistant application 320 (or the media player module 321 of the DPA 320), the respective one of the first and second sets of account credentials 315, 325 are provided to the interface component 340.

Figure 4:
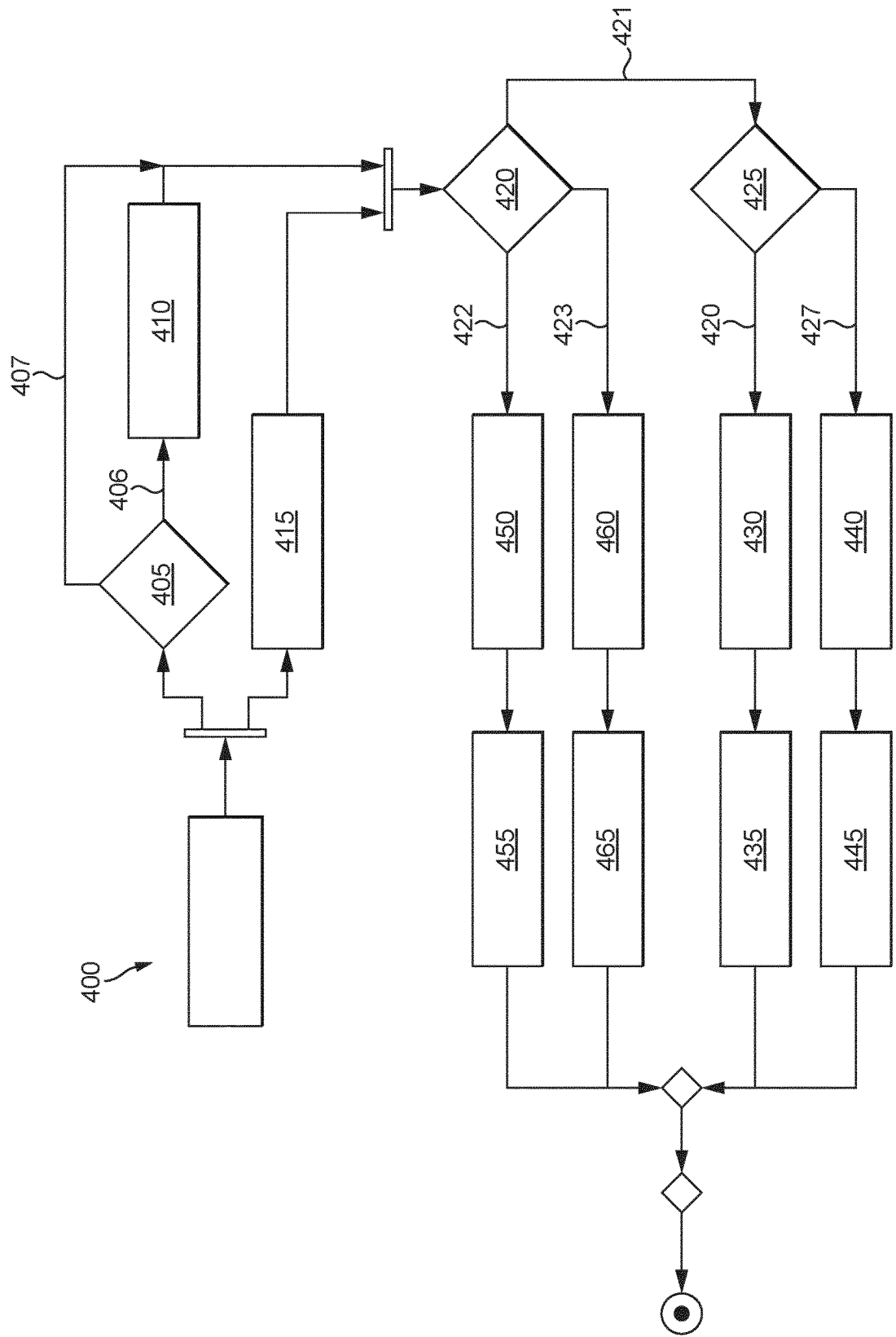
FIG. 4 shows a method according to an embodiment of the invention.
Figure 5:
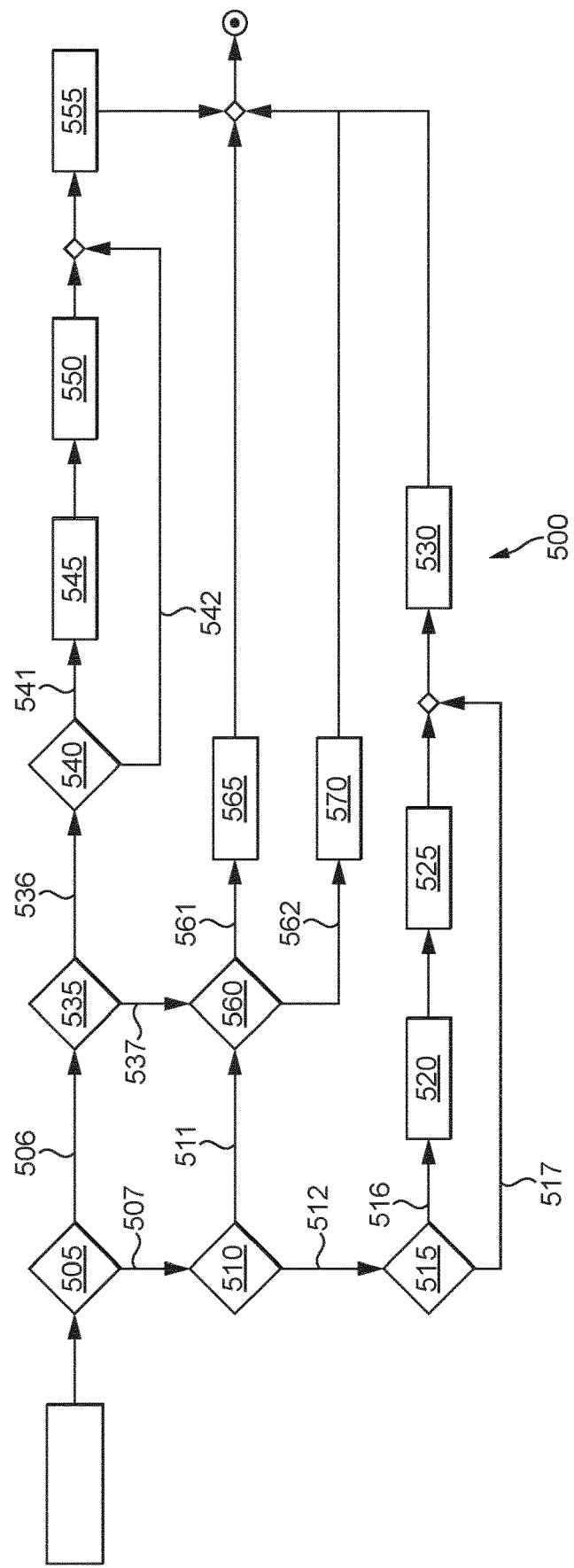
FIG. 5 shows a further method according to an embodiment of the invention.

FIGS. 4 & 5 illustrate methods 400, 500 according to embodiments of the invention. The methods 400, 500 may be performed by the system 100 illustrated in FIG. 1. In particular, the memory 130 may comprise computer-readable instructions which, when executed by the processor 120, perform the methods 400, 500 according to embodiments of the invention.

The methods 400, 500 are methods for use with the vehicle 200 illustrated in FIG. 2. In particular, the methods are for use with a system 100 comprising a media player application 310 associated with a first set of account credentials 315 for accessing a remote streaming media source to receive streaming media content to output the streaming media content and a digital personal assistant application 320 associated with a second set of account credentials 325 for accessing the remote streaming media source to receive streaming media content to output the streaming media content. In particular, the methods 400, 500 may be performed by the streaming media source manager 330 to dynamically select one of the MPA 310 or the DPA 320 for accessing the streaming media source interface component 340 as will be described.

Referring to FIG. 4, the method 400 comprises blocks 405, 410, 415 which obtain the credentials 315, 325 associated with the MPA 310 and the DPA 320. In particular, the blocks 405, 410, 415 obtain the first credentials 315 and the second credentials 325. In one embodiment, blocks 405, 410, 415 comprise a block 405 of determining whether the MPA 310 is associated with respective credentials i.e. the first credentials 315. As described above, the first and second credentials 315, 325 may be obtained via a linking process which, if not performed, leads to one or both of the MPA 310 and 320 not being associated with a respective set of credentials 315, 325. If the MPA 320 is associated with the first credentials 315, i.e. the first credentials 315 are present, the method moves via 406 to block 410. If the first credentials 315 do not exist, the method 400 moves via 407 to block 420. Determining whether the first credentials 315 exist may comprise determining whether the MPA 310 is associated with the access token and username. In block 410, the streaming media source manager 330 obtains the first credentials 315 associated with the MPA 310. In one embodiment, block 410 comprises obtaining the access token and username of the first credentials 315.

An assumption made by the embodiment of the method 400 illustrated in FIG. 4 is that the DPA 320 is linked to second credentials 325. It will be appreciated that the method 400 may comprise a block, similar to block 410, of checking whether the DPA 320 is associated with the second credentials 325.

In block 415 the streaming media source manager 330 is arranged to obtain the second credentials 325 associated with the DPA 320. In one embodiment, block 415 comprises obtaining the access token and username of the second credentials 325. Block 415 may be performed at least partly simultaneously with either or both of blocks 405, 410. After completion of blocks 410, 415 the method moves to block 420.

In embodiments of the invention, a selection of one of the MPA 310 or DPA 320 to provide one of the respective first and second sets of account credentials 315, 325 to the streaming media source interface component 340 to access the remote streaming media source is made in dependence on a comparison of the first and second credentials 315, 325. Thus block 420 comprises comparing the first and second credentials 315, 325. A selection of one of the MPA 310 or DPA 320 may be made in dependence on the first credentials 315 differing from the second credentials 325. In one embodiment, block 420 comprises comparing a username of the first credentials 315 ('first username') with a username 425 of the second credentials 325 ('second username').

If in block 420 it is determined that the first and second credentials match i.e. are the same, the method moves via 422 to blocks 450, 455. In some embodiments, the method 400 moves to blocks 450, 455 if the first username matches the second username. Blocks 450, 455 correspond to a selection of the MPA 310 by the streaming media source manager 330.

In block 450 the streaming media source manager 330 is arranged to associate the MPA 310 with the streaming media source interface component 340. In block 450 the streaming media source manager 330 is arranged to cause the MPA 310 to log into the streaming media source interface component 340 in some embodiments. Block 450 may comprise the streaming media source manager 330 providing at least the access token of the first credentials 315 to the streaming media source interface component 340, such as via the API of the streaming media source interface component 340. The streaming media source manager 330 may provide the username of the first credentials 315 to the streaming media source interface component 340 in block 450. As discussed, the streaming media source interface component 340 is arranged to determine a validity of the first credentials with the streaming media source.

In block 455 the MPA 310 is used to obtain streaming media and the output the received streaming media, such as by outputting the streaming media on the one or more speakers 160. The MPA 310 is used in some embodiments for obtaining all streaming media when the first and second credentials match, such as having the same username.

In block 420 if the MPA 310 is not associated with respective credentials i.e. is not linked to the first credentials 310 (first credential do not exist) then method 400 moves via 423 to block 460.

In block 460, where only the DPA 320 is associated with respective credentials 325, the streaming media source manager 330 is arranged to cause the DPA 320 to log into the streaming media source interface component 340. Block 460 may comprise the streaming media source manager 330 providing at least the access token of the second credentials 325 to the streaming media source interface component 340, such as via the API of the streaming media source interface component 340. The streaming media source manager 330 may provide the username of the second credentials 325 to the streaming media source interface component 340 in block 460. The streaming media source interface component 340 is arranged to determine a validity of the second credentials 325 with the streaming media source. In block 465 the DPA 320 is used to obtain streaming media and the output the received streaming media, such as by outputting the streaming media on the one or more speakers 160. The DPA 320 is used in some embodiments for obtaining all streaming media in block 465.

If in block 420 it is determined that the first and second credentials do not match i.e. are different, the method moves via 421 to blocks 425. In some embodiments, the method 400 moves to block 425 if the first username does not match, i.e. is different to, the second username.

In blocks 425-445, the streaming media source manager 330 is arranged to select one of the MPA 310 or the DPA 320 for accessing or interfacing with the streaming media source interface component 340 in dependence on one or both of a currently active one of the MPA 310 and the DPA 320, and/or one or more characteristics of a user input corresponding to the command for controlling or requesting streaming media from the remote streaming media source, as will be explained.

In block 425, in one embodiment, the one or more characteristics on which the determination is based comprise determining whether the user input is indicative of a command to request the streaming media content from the remote streaming media source. In particular, in some embodiments, determining whether the command is a 'play' command which comprises an identification of the requested streaming media content requested from the remote streaming media source.

As discussed above, play is command is indicative of a selection of a media stream, for example corresponding to an album or artist, although it will be realised that other selection criteria may be used. The user input corresponding to the play command may be indicative of an identifying request for the media, such as a request for an identified album and/or artist, for example applied to a graphically displayed keyboard, a selection of a graphically displayed icon corresponding to the album or a spoken request "Play Shed 7 A Maximum High". In such cases, a request or command communicated to the streaming media source for the media may be accompanied by identification (ID) information for the requested media. In other words, "play content" is understood to mean, for example, that a request to play new media specifies a "track ID". This would come as a result of the user saying: "play the album Red by Taylor Swift" or even simply "play Bruno Mars".

It is expected that the request or command for streaming media content comprising an identification of the requested content is able to be handled via the interface through which the request is received. Therefore, block 425 comprises determining whether the play request was received via the MPA 310 or the DPA 320. If the play request was received via the MPA 310 the method follows 426 to blocks 430, 435.

If, however, the play request was received via the DPA 320 the method follows 427 to blocks 440, 445.

In block 425, as noted above, the one or more characteristics on which the determination is based comprise determining whether the user input is indicative of a command to request the streaming media content from the remote streaming media source. In particular, in some embodiments, block 425 comprises determining whether the command is a 'playback' command where the requested media is relative to other media, such as previously reproduced media. For example, the playback command may be a command to resume playing, pause, skip to a previous or next track etc. Such a playback command may be provided via physical buttons, such as may be located on a steering wheel or console of a vehicle, or via a GUI of the display device e.g. the user touching a displayed icon, or as a spoken request e.g. "pause" or "next track", for example. Block 425 comprises determining whether the playback command was received via the MPA 310 or the DPA 320. In some embodiments, block 425 further comprises determining a currently active one of the MPA 310 or the DPA 320. By currently active it is understood to mean which one of the MPA 310 or the DPA 320 is currently associated or 'logged in' to the streaming media source interface component 340.

If the playback request was received via the DPA 320 in block 425 and the DPA 320 is currently active, the method follows 426 to blocks 430, 435. If, however, the playback request was received via the DPA 320 and the MPA 310 is currently active, the method follows 427 to blocks 440, 445.

In block 430 the streaming media source manager 330 is arranged to cause the DPA 320 to log into the streaming media source interface component 340. Block 430 may comprise the streaming media source manager 330 providing at least the access token of the second credentials 325 to the streaming media source interface component 340, such as via the API of the streaming media source interface component 340. The streaming media source manager 330 may provide the username of the second credentials 325 to the streaming media source interface component 340 in block 430. The streaming media source interface component 340 is arranged to determine a validity of the second credentials 325 with the streaming media source.

In block 435 the DPA 320 is used to obtain streaming media and the output the received streaming media, such as by outputting the streaming media on the one or more speakers 160. Block 435 may comprise the DPA 320 commanding the streaming media source, via the streaming media source interface component 340, to provide streaming media to the system 100 i.e. communicating the request for the streaming media to the streaming media source.

In block 440 the streaming media source manager 330 is arranged to associate the MPA 310 with the streaming media source interface component 340. In block 440 the streaming media source manager 330 is arranged to cause the MPA 310 to log into the streaming media source interface component 340 in some embodiments. Block 440 may comprise the streaming media source manager 330 providing at least the access token of the first credentials 315 to the streaming media source interface component 340, such as via the API of the streaming media source interface component 340. The streaming media source manager 330 may provide the username of the first credentials 315 to the streaming media source interface component 340 in block 440. As discussed, the streaming media source interface component 340 is arranged to determine a validity of the first credentials with the streaming media source.

In block 445 the MPA 310 is used to obtain streaming media and output the received streaming media, such as by outputting the streaming media on the one or more speakers 160. Block 445 may comprise the MPA 310 commanding the streaming media source, via the streaming media source interface component 340, to provide streaming media to the system 100 i.e. communicating the request for the streaming media to the streaming media source.

As can be appreciated, in the method 400 described above the streaming media source manager 330 dynamically determines which source i.e. which of the MPA 310 and DPA 320 are to provide respective credentials to the streaming media source interface component 340. In this way, both the MPA 310 and the DPA 320 are able to utilise the streaming media source interface component 340 without two physical devices being logically recognised by the streaming media source.

Referring to FIG. 5, a further method 500 according to another embodiment of the invention is illustrated.

The method 500 comprises a block 505 of determining a type of user activity or interaction with the system 100. The type of user input or activity may be selected from one of a plurality of predetermined types, such as touch and voice input. If the activity is voice interaction i.e. the system 100 receives a spoken or audible voice command, the method 500 follows 506 to block 535. If the activity in block 505 is a user selection of one of the MPA 310 or the DPA 320 the method 500 follows 507 to block 510. The selection of one of the MPA 310 or the DPA 320 may be by, for example, a user input received at the display device at an icon corresponding to one of the MPA 310 or the DPA 320.

In block 510 it is determined whether the selection is of the MPA 310 or the DPA 320. If the selection corresponds to the DPA 320 the method 500 follows 511 to block 540. If the selection corresponds to the MPA 310 the method 500 follows 512 to block 515. Paths 511, 512 associate the selected source i.e. one of the MPA 310 or the DPA 320 with the streaming media source interface component 340.

In block 515 it is determined whether the MPA 310 is currently associated with, or logged into, the streaming media source interface component 340. If not, the method follows 516 to block 520. If the MPA 310 is currently associated with the streaming media source interface component 340 and is therefore able to obtain streaming media, the method 500 follows 517 to block 530.

In block 520, a currently logged in component (if any) is logged out from the streaming media source interface component 340. In one embodiment, the streaming media source manager 330 provides a log out instruction, such as via an appropriate API, to the streaming media source interface component 340 to log out. In block 525 the streaming media source manager 330 is arranged to associate the MPA 310 with the streaming media source interface component 340. In block 525 the streaming media source manager 330 is arranged to cause the MPA 310 to log into the streaming media source interface component 340 in some embodiments. Block 525 may comprise the streaming media source manager 330 providing at least the access token of the first credentials 315 to the streaming media source interface component 340, such as via the API of the streaming media source interface component 340. The streaming media source manager 330 may provide the username of the first credentials 315 to the streaming media source interface component 340 in block 525.

In block 530 the MPA 310 is arranged to produce streaming media content, such as audio content, via the system 100. Block 530 may comprise the MPA 310 reproducing a last reproduced content by requesting the streaming media from the streaming media source via the interface component 340. Block 530 may comprise the MPA 310 commanding the streaming media source, via the streaming media source interface component 340, to provide streaming media to the system 100 i.e. communicating the request for the streaming media to the streaming media source.

Returning to block 505, when the method follows path 506 corresponding to a voice interaction the method reaches block 535. In block 535 it is determined whether the voice interaction is a play interaction e.g. associated with content ID or a playback interaction, requesting relative content, as discussed above. If the interaction or command is a play command the method 500 follows 536 to block 540. If the interaction or command is a playback command, the method 500 follows 537 to block 560.

In block 540 it is determined whether the DPA 320 is currently associated with, or logged into, the streaming media source interface component 340. If not, the method follows 541 to block 545. If the DPA 320 is currently associated with the streaming media source interface component 340, and is therefore able to obtain streaming media, the method 500 follows 542 to block 555.

In block 545, a currently logged in component (if any) is logged out from the streaming media source interface component 340. In one embodiment, the streaming media source manager 330 provides a log out instruction, such as via an appropriate API, to the streaming media source interface component 340 to log out. In block 550 the streaming media source manager 330 is arranged to associate the DPA 320 with the streaming media source interface component 340. In block 550 the streaming media source manager 330 is arranged to cause the DPA 320 to log into the streaming media source interface component 340 in some embodiments. Block 550 may comprise the streaming media source manager 330 providing at least the access token of the second credentials 325 to the streaming media source interface component 340, such as via the API of the streaming media source interface component 340. The streaming media source manager 330 may provide the username of the second credentials 325 to the streaming media source interface component 340 in block 550.

In block 555 the DPA 320 is arranged to produce streaming media content, such as audio content, via the system 100. Block 555 may comprise the DPA 320 reproducing the requested content corresponding to the ID by requesting the streaming media from the streaming media source via the interface component 340. In some embodiments, the request for the streaming media may be for the streaming media source to resume playing a last played streaming media. For example, an identification of the last played streaming media may be stored at the system 100 which is subsequently requested from the streaming media source. Alternatively the identification of the last played content may be stored at the streaming media source, which is requested by the system 100 to provide as the streaming media content. Block 555 may comprise the DPA 320 commanding the streaming media source, via the streaming media source interface component 340, to provide streaming media to the system 100 i.e. communicating the request for the streaming media to the streaming media source.

Where the method 500 progresses to block 560 via 537 from block 535, it is determined in block 560 which streaming media source is currently active i.e. which of the MPA 310 or the DPA 320 is currently associated with, or logged into, the streaming media source interface component 340. If the MPA 310 is currently associated with the streaming media source interface component 340 the method progresses to block 565 via 561. If the DPA 320 is currently associated with the streaming media source interface component 340 the method progresses to block 570 via 562.

In blocks 565 and 570, the playback command is executed by the currently active one of the MPA 310 and the DPA 320 i.e. via the MPA 310 in block 565 and via the DPA 320 in block 570.

It can be appreciated from the method 500 illustrated in FIG. 5 that in the method 400 described above the streaming media source manager 330 dynamically determines which source i.e. which of the MPA 310 and DPA 320 are to provide respective credentials to the streaming media source interface component 340. In this way, both the MPA 310 and the DPA 320 are able to utilise the streaming media source interface component 340 without two physical devices being logically recognised by the streaming media source.

It will be appreciated that various changes and modifications can be made to the present invention without departing from the scope of the present application.

The invention claimed is:

1. A control system for a media player, the control system comprising one or more electronic processors, the control system comprising:
 a media player application operably executable on the one or more electronic processors and associated with a first set of account credentials for accessing a remote streaming media source to receive streaming media content to output the streaming media content via the media player;
 a digital personal assistant application operably executable on the one or more electronic processors and associated with a second set of account credentials for accessing the remote streaming media source to receive streaming media content to output the streaming media content via the media player;
 a streaming media source interface component operably executable on the one or more electronic processors and configured to receive account credentials to access the remote streaming media source and a command for requesting media from the remote streaming media source; and
 a streaming media source manager operably executable on the one or more electronic processors and configured to dynamically select one of the media player application and the digital personal assistant application to provide one of the first and second sets of account credentials to the streaming media source interface component to access the remote streaming media source.

2. The control system according to claim 1, wherein the streaming media source manager is arranged to perform said selection in dependence on a comparison of the first and second sets of account credentials.

3. The control system according to claim 1, wherein the streaming media source manager is arranged to perform said selection in dependence on a currently active one of the media player application and the digital personal assistant application, and one or more characteristics of a user input corresponding to the command for controlling the remote streaming media source.

4. The control system according to claim 1, wherein the streaming media source manager is arranged to perform said selection in dependence on the first set of account credentials differing from the second set of account credentials.

5. The control system according to claim 3, wherein the one or more characteristics comprise the user input being indicative of a command to request the streaming media content from the remote streaming media source.

6. The control system according to claim 5, wherein the streaming media source manager is arranged to select the media player application in dependence on the one or more characteristics of the user input comprising a source of the user input being the digital personal assistant application, and the media player application being currently active.

7. The control system according to claim 1, wherein the streaming media source manager is arranged to select the media player application in dependence on the media player application being currently active.

8. The control system according to claim 3, wherein the one or more characteristics of the user input comprise a type of the user input and when the type of the user input corresponds to a voice input, the streaming media source manager is arranged to:
 select the digital personal assistant application; or
 select the currently active one of the media player application and the digital personal assistant application.

9. The control system according to claim 1, wherein the providing one of the first and second sets of account credentials to the streaming media source interface component to access the remote streaming media source comprises the streaming media source manager logging one of the media player application and the digital personal assistant application into the streaming media source interface component using the respective one of the first and second sets of account credentials.

10. The control system according to claim 1, wherein each of the first and second sets of account credentials comprise a respective one of a first and second authorisation token and the selecting comprises providing the authorisation token to the streaming media source interface component.

11. The control system according to claim 1, wherein the streaming media source manager is arranged, when the selected one of the media player application and the digital personal assistant application is not the currently active one of the media player application and the digital personal assistant application, to log the currently active one of the media player application and the digital personal assistant application out of the streaming media source interface component.

12. A system, comprising:
 the control system according to claim 1; and
 a media player comprising at least one output device for outputting the streaming media content to a user.

13. A vehicle comprising the control system according to claim 1.

14. A computer-implemented method for use with a system comprising a media player application associated with a first set of account credentials for accessing a remote streaming media source to receive streaming media content to output the streaming media content on a media player and a digital personal assistant application associated with a second set of account credentials for accessing the remote streaming media source to receive streaming media content to output the streaming media content on the media player, the computer-implemented method comprising:
 selecting, by a streaming media source manager, one of the media player application and the digital personal assistant application to dynamically provide one of respective first and second sets of account credentials to a streaming media source interface component to access the remote streaming media source; and
 receiving, at the streaming media source interface component, the selected account credentials to access the remote streaming media source and a command for requesting media from the remote streaming media source.

15. A non-transitory, computer readable storage medium storing instructions thereon which, when executed by one or more electronic processors, causes the one or more electronic processors to perform the method according to claim 14.

16. The control system according to claim 5, wherein the user input is indicative of at least one of:
- a play command comprising an identification of the streaming media content requested from the remote streaming media source; and
- a playback command to request streaming media content relative to current streaming media content from the remote streaming media source.

* * * * *